(12) United States Patent
Port

(10) Patent No.: US 11,391,365 B2
(45) Date of Patent: Jul. 19, 2022

(54) PLANETARY GEAR DEVICE COMPRISING AXIALLY ROTATION-PROTECTED THRUST WASHER AND USE

(71) Applicant: ebm-papst St. Georgen GmbH & Co. KG, St. Georgen (DE)

(72) Inventor: Fabian Port, Erlangen (DE)

(73) Assignee: EBM-PAPST ST. GEORGEN GMBH & CO. KG, St. Georgen (DE)

( * ) Notice: Subject to any disclaimer, the term of this patent is extended or adjusted under 35 U.S.C. 154(b) by 0 days.

(21) Appl. No.: 17/071,642

(22) Filed: Oct. 15, 2020

(65) Prior Publication Data

US 2021/0116019 A1 Apr. 22, 2021

(30) Foreign Application Priority Data

Oct. 21, 2019 (DE) .................. 10 2019 216 183.9

(51) Int. Cl.
*F16H 57/08* (2006.01)
*F16C 17/04* (2006.01)
*F16H 1/28* (2006.01)

(52) U.S. Cl.
CPC ............. *F16H 57/08* (2013.01); *F16C 17/04* (2013.01); *F16H 1/28* (2013.01); *F16C 2361/61* (2013.01)

(58) Field of Classification Search
CPC .......... F16H 57/08; F16H 1/28; F16H 57/082; F16H 2057/085; F16H 2057/0216; F16C 17/04; F16C 2361/61
USPC ......................................................... 411/533
See application file for complete search history.

(56) References Cited

U.S. PATENT DOCUMENTS

| | | | | |
|---|---|---|---|---|
| 3,316,035 A | * | 4/1967 | Zuber .................... | F16C 33/66 384/127 |
| 3,573,510 A | * | 4/1971 | Otto ....................... | F16C 33/74 384/412 |
| 4,615,231 A | * | 10/1986 | Takahashi ........... | F16H 57/0427 74/467 |
| 5,302,160 A | * | 4/1994 | Fujioka ................ | F16H 57/082 475/348 |
| 5,368,528 A | * | 11/1994 | Farrell ................... | F16C 19/48 384/424 |

(Continued)

FOREIGN PATENT DOCUMENTS

DE 102007041184 A1 * 3/2009 .............. F16C 33/08

*Primary Examiner* — Sherry L Estremsky
(74) *Attorney, Agent, or Firm* — International IP Law Group, PLLC

(57) ABSTRACT

A planetary gear device including an axially rotation-protected thrust washer is described herein. The planetary gear device includes gear components revolving around an axis of rotation, wherein the gear components include a planet gear, as well as a planetary carrier for the planet gear. The planetary gear device also includes a gear housing encasing the revolving gear components, a thrust washer supported around or at the axis of rotation, and a rotation protection, by means of which the thrust washer can be positioned so as to be rotation-protected. The rotation protection is an axially-engaging rotation protection, and the thrust washer is arranged such that the axially-engaging rotation protection is provided relative to the planetary carrier and/or relative to the gear housing by means of an axially-protruding protrusion at an interface between the thrust washer, the planetary carrier, and/or the gear housing.

18 Claims, 4 Drawing Sheets

(56) References Cited

U.S. PATENT DOCUMENTS

| | | | | |
|---|---|---|---|---|
| 5,370,590 | A * | 12/1994 | Premiski | F16B 21/183 |
| | | | | 475/346 |
| 5,830,098 | A * | 11/1998 | Kimes | F16H 57/0482 |
| | | | | 475/159 |
| 5,928,105 | A * | 7/1999 | Taha | F16H 57/082 |
| | | | | 475/331 |
| 6,106,429 | A * | 8/2000 | Mortensen | F16H 57/082 |
| | | | | 475/331 |
| 6,702,711 | B2 * | 3/2004 | Zelikov | F16H 57/082 |
| | | | | 475/331 |
| 7,520,190 | B2 * | 4/2009 | Hasegawa | F02N 15/022 |
| | | | | 267/161 |
| 8,353,797 | B2 * | 1/2013 | Burgman | F16H 57/082 |
| | | | | 475/159 |
| 9,759,289 | B2 * | 9/2017 | Chung | F16H 37/065 |
| 9,869,385 | B1 * | 1/2018 | Shah | F16H 57/082 |
| 10,458,519 | B2 * | 10/2019 | Guttenberger | F16H 1/46 |
| 10,781,911 | B2 * | 9/2020 | Payne | F16C 19/44 |

* cited by examiner

PLANETARY GEAR DEVICE COMPRISING AXIALLY ROTATION-PROTECTED THRUST WASHER AND USE

CROSS REFERENCE TO RELATED APPLICATION

Pursuant to 35 U.S.C. § 119, this application claims priority to German (DE) Patent Application No. 10 2019 216 183.9, filed Oct. 21, 2019, the contents of which are incorporated by reference as if set forth in their entirety herein.

TECHNICAL FIELD OF THE INVENTION

The present techniques relate to the field of planetary (or epicyclic) gearing. More specifically, the present techniques relate to thrust washers for planetary (or epicyclic) gear devices.

BACKGROUND OF THE INVENTION

Planetary gear (also referred to as "epicyclic gear") devices generally include a centrally-located sun gear (also referred to as a "sun gearwheel", "central gear", or "central gearwheel"), one or more planet gears (also referred to as "planet gearwheels") located around the sun gear, and an external annulus gear (also referred to as a "ring gear") that encompasses the sun gear and the planet gears. In operation, the rotation of the sun gear transmits torque to the planet gears, which orbit around the sun gear. In such planetary gear devices, thrust washers are typically used for axially starting the rotation of the planet gears. However, thrust washers can also perform other functions, such as providing for elasticity, local separation of gear components, damping, and separation of relative movements, for example. According to current technology, there are some gear configurations in which a central thrust washer is used for all the planet gears within a single gear stage. Alternatively, there are other gear configurations in which individual thrust washers are provided for each planet gear within a single gear stage.

Depending on the operating state or tolerance ranges for the individual gear components, it is possible that a thrust washer will not be set into rotation correctly and/or will perform an unwanted relative rotational movement, such as co-rotation. Co-rotation of the thrust washer, however, is disadvantageous, often causing unwanted acoustic side effects. Furthermore, thrust washers that are not arranged so as to be rotation-protected may produce background noise, which may be perceived as a scratching or rattling sound that is associated with vibrations and wear and tear of the thrust washer. Therefore, it is often preferable for thrust washers of this type to be secured against rotation. Specifically, it may be preferable to provide rotation protection for the thrust washers corresponding to both the sun gear and the planet gears.

SUMMARY OF THE INVENTION

The following summary is intended to provide a basic understanding of the embodiments described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In various embodiments, a planetary gear device is described. The planetary gear device includes gear components revolving around an axis of rotation, wherein the gear components comprise a planet gear, as well as a planetary carrier for the planet gear. The planetary gear device also includes a gear housing encasing the revolving gear components, a thrust washer supported around or at the axis of rotation, and a rotation protection, by means of which the thrust washer can be positioned so as to be rotation-protected. The rotation protection is an axially-engaging rotation protection, and the thrust washer is arranged such that the axially-engaging rotation protection is provided relative to the planetary carrier and/or relative to the gear housing by means of an axially-protruding protrusion at an interface between the thrust washer, the planetary carrier, and/or the gear housing.

In such embodiments, the planetary carrier may be designed as a disk. In such embodiments, the axially-engaging rotation protection may be at least partially provided by means of the thrust washer and may be designed at a radially outer circumferential contour of the thrust washer, in particular at several circumferential positions, in particular exclusively radially outside in a radial region of the thrust washer located farthest on an outside. Further, in such embodiments, the thrust washer may engage in a positive and/or non-positive manner with the planetary carrier and/or with the gear housing or with a housing component of the gear housing by means of the axially-engaging rotation protection, in particular without play.

In such embodiments, the thrust washer may be designed as a central thrust washer, which is assigned to a plurality of planet gears; and/or the thrust washer may be a shaped part comprising axial protrusions created by means of shaping, in particular a bent part. In addition, in such embodiments, the axially-engaging rotation protection may be provided by means of a positive and/or non-positive axial coupling, which coupling ensures a material-elastic biasing in the radial direction, in particular by means of material-elastic biasing of axial protrusions of the thrust washer inward or outward in the radial direction; and/or the thrust washer may form a material-elastically biased coupling with the planetary carrier and/or with the gear housing, in particular an intermediate flange, in particular an axial plug-in coupling with material-elastic biasing in the radial direction.

In such embodiments, the thrust washer may be arranged such that the axially-engaging rotation protection is provided relative to the planetary carrier by means of positive axial engagement with an axially-protruding protrusion in the axial direction. In addition, the axially-protruding protrusion may be provided by means of the thrust washer, and the planetary carrier may have a geometrically corresponding contour at an outer jacket surface, in particular a surface portion, for receiving the axially-protruding protrusion.

In such embodiments, the axially-engaging rotation protection may be provided by means of the thrust washer, in particular as an integral one-piece design of the thrust washer. Additionally or alternatively, the axially-engaging rotation protection may be provided at an outer contour of the thrust washer located radially on the outside, in particular at the edge of the thrust washer defining the outer circumference of the thrust washer. Additionally or alternatively, the axially-engaging rotation protection may be arranged at a radial offset relative to the circumferential edge of the thrust washer, in particular at least 1 to 5% of a radius or a diameter of the thrust washer.

In such embodiments, the axially-engaging rotation protection may include a plurality of protrusions arranged at the outer contour of the thrust washer designed as tabs, in particular in symmetrical equidistantly spaced apart, fully-circumferential arrangement, for example four protrusions each offset by 90°. Additionally or alternatively, the axially-engaging protrusion may extend in an axial direction in a range of 1 to 10 percent of a diameter of the thrust washer. Additionally or alternatively, the axially-engaging protrusion may extend in a circumferential direction in a range of 1 to 15° at the thrust washer.

In such embodiments, the gear housing may include an intermediate flange and/or be at least partially formed by the intermediate flange, at which intermediate flange recesses corresponding to protrusions of the axial rotation protection are formed, in particular at an inner jacket surface, wherein the thrust washer is axially rotation-protected at the intermediate flange. Moreover, in such embodiments, the thrust washer may be coupled to the planetary carrier and/or to the gear housing by means of a play adaptation, in particular to the gear housing, in particular by means of material-elastic biasing in the radial direction; or the thrust washer may be coupled to the planetary carrier and/or to the gear housing by means of a clamping fit, in particular to the planetary carrier, in particular by means of material-elastic biasing in the radial direction; or the thrust washer may be coupled to the planetary carrier and/or to the gear housing by means of non-positive biasing, in particular to the planetary carrier by means of radially-biased strutting, in particular by means of material-elastic biasing in a radial direction at an outer jacket surface of the planetary carrier.

In such embodiments, the thrust washer for securing the axial rotation protection may be coupled to the planetary carrier and/or the gear housing without play or at least essentially without play, in particular by means of the axial protrusions in a positive and/or non-positive coupling arrangement at an inner or outer jacket surface. In such embodiments, the axially-engaging rotation protection may be provided by the thrust washer in an axially-engaging arrangement of the thrust washer with the planetary carrier and/or with an intermediate flange of the planetary gear device, wherein axial protrusions are provided at the thrust washer, in particular as an integral one-piece design, and are brought into axial positive and/or non-positive engagement with the planetary carrier and/or the intermediate flange, in particular in that the axial protrusions are brought into abutment without play at an outer jacket surface of the planetary carrier and/or at an inner jacket surface of the intermediate flange at respective corresponding positive and/or non-positive contours or fastening means. In such embodiments, the intermediate flange may be set up to form axial rotation protection in a coupling arrangement with the thrust washer. In addition, the intermediate flange may have an inner jacket surface that defines recesses, and the recesses may be designed so as to geometrically correspond to axial protrusions of the thrust washer, and which are arranged and set up for a positive and/or non-positive coupling with the axial protrusions by means of axial engagement, in particular in response to material-elastic biasing in a radial direction.

In such embodiments, the planetary carrier may be set up to form an axial rotation protection in a coupling arrangement with the thrust washer. In addition, the planetary carrier may have an outer jacket surface that defines surface portions, and the surface portions may be designed so as to geometrically correspond to axial protrusions of the thrust washer, and which are arranged and set up for a positive and/or non-positive coupling with the axial protrusions by means of axial engagement, in particular in response to material-elastic biasing in a radial direction.

In other embodiments, a thrust washer for a planetary gear device is described. The thrust washer includes axial protrusions for a play-free non-positive and/or positive axial rotation protection of the thrust washer at a planetary carrier and/or at a gear housing component, in relative arrangement in the planetary gear device such that the axial rotation protection is provided by means of axially-engaging corresponding contours at the thrust washer as well as at the planetary carrier and/or at the gear housing component. In such embodiments, the gear housing component may include an intermediate flange.

In other embodiments, a central thrust washer for a planetary gear device is described. The central thrust washer includes axial protrusions for providing an axial rotation protection with respect to revolving gear components of a gear stage by means of play-free non-positive and/or positive axial engagement of the central thrust washer with an intermediate flange or a planetary carrier of the planetary gear device, in that axial protrusions of the thrust washer engage axially with corresponding contours or recesses of the intermediate flange, which extend axially, or with corresponding contours or surface portions of the planetary carrier, and cooperate in a positive and/or non-positive manner with axial contours corresponding to the planetary carrier, and thus form the axial rotation protection. In such embodiments, the revolving gear components may include at least one planet gear. Moreover, in such embodiments, the axial rotation protection may be provided without play at several circumferential positions.

BRIEF DESCRIPTION OF THE DRAWINGS

The present techniques will be described in more detail in the following drawing figures, whereby for reference numerals which are not described explicitly in a respective drawing figure, reference is made to the other drawing figures, in which.

DETAILED DESCRIPTION

Figure 1:
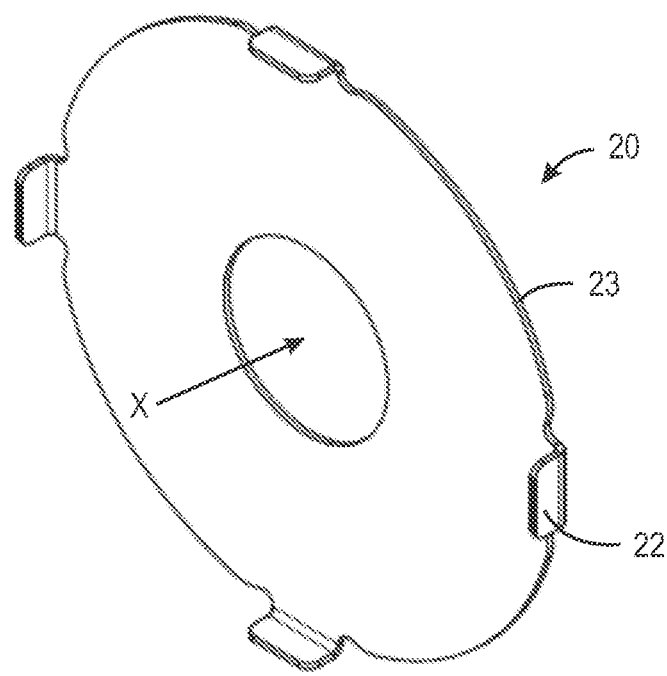
FIG. 1 is a perspective view of an exemplary embodiment of a thrust washer for a planetary gear device.

The planetary gear device described herein provides rotation protection for at least one gear stage within the planetary gear device. This is accomplished using a rotation-protected mounting of a thrust washer, for effectively avoiding relative movements of the thrust washer, in particular with regard to at least one adjacent gear component designed as a planet gearwheel. More specifically, the present techniques provide rotation protection of the thrust washer in a simple and robust manner even in different types of gears or relative positions, in particular even in the case of advantageous side effects with regard to acoustic emissions or friction, respectively, and wear.

Embodiments described herein provide a planetary gear device comprising: several gear components revolving around an axis of rotation, comprising at least one planet gear; a planetary carrier for the at least one planet gear, in particular designed as a disk; a gear housing encasing the revolving gear components; at least one thrust washer supported around the axis (or at the axis) of rotation; a rotation protection, by means of which the (respective) thrust washer can be positioned so as to be rotation-protected, in particular so as to be rotation-protected around the axis of rotation.

According to the present techniques, it is proposed that the rotation protection is an axially-engaging rotation protection (in particular a rotation protection, which engages exclusively in the axial direction, without radial engagement), wherein the at least one thrust washer is arranged and designed in such a way that the axially-engaging rotation protection is provided relative to the planetary carrier and/or relative to the gear housing (or a housing component of the gear housing, respectively), in particular by means of at least one axially-protruding or axially-engaging protrusion, respectively, at the interface between the thrust washer and the planetary carrier and/or gear housing (or the housing component, respectively). This provides advantages with regard to securing, support, and relative arrangement of the thrust washer, in particular also relative to a plurality of planet gears. The concept of the axially-engaging protrusions thereby also provides variation options, e.g., with regard to non-positive and/or positive connection, and makes it possible to optimize the planetary gear device in a simple manner, in particular in each case centrally for at least one gear stage. A rotation protection of this type that is provided by engagement in the axial direction can also be referred to herein as an "axially rotation protected" arrangement.

At least one thrust washer is in particular provided for each gear stage. In addition to the planet gears, further gear components can also be provided, in particular from the following group, in particular in each case for each gear stage: annulus gear, sun gear, and/or (further) carrier disks.

This also results in the advantage that the geometry of the thrust washer can be selected independently of a gearing geometry (in particular independently of the annulus gear or sun gear), and independently of the carrier plate pitch circles. Thanks to many degrees of freedom, the thrust washer can thus be designed and optimized in a particularly specific manner, in particular also designed as a central thrust washer, which is assigned to a plurality of planet gears (in contrast to individual thrust washers, in each case individually only for a single planet gear).

It has been shown that an axial rotation protection, which is at least partially provided by means of the thrust washer, also provides for a particularly simple and robust setup and, last but not least, also allows for large structural degrees of freedom. An optimization of a positive connection geometry, for example, is possible in a comparatively simple and cost-efficient manner, especially when the thrust washer is designed as a shaped or stamped part, respectively (in particular made from a plate-shaped, semi-finished product).

In contrast to previously-tested technologies, the present techniques are also based on the concept of securing the (respective) thrust washer as far as possible radially on the outside, in particular in that the rotation protection is ensured at an outer jacket surface of the planetary carrier and/or at an inner jacket surface of the corresponding housing component (in particular an intermediate flange) by means of axial engagement. A certain damping effect can thereby also be ensured, in particular in the case of (or due to) material-elastic characteristics, respectively, of the thrust water or of the protrusions, respectively.

As used herein, the terms "planetary gear device" and "planet gear" (or "planet gearwheel"), respectively, can also identify epicyclic gear devices and epicyclic gears (or epicyclic gearwheels). The respective revolving gear components can be designed, for example, as so-called planet gears, which can in each case also rotate relative to one another and can be supported between the sun gear and the annulus gear.

In some embodiments, the planetary carrier is essentially designed as disk, which has a central gearwheel. Furthermore, in some embodiments, the gear housing also includes (or is partially formed by) an intermediate flange, which can also be referred to as a housing flange or a housing intermediate flange, in particular due to an encasing function. In other words, the axial rotation protection can also be provided by axial engagement with the intermediate flange. In particular, an axial housing segment, in which gear components are (or can be) respectively arranged, provided, or at least encased as well, is to thereby be understood as the intermediate flange in terms of the present techniques. The intermediate flange can, for example, also accommodate the planetary carrier.

According to one exemplary embodiment, the axially-engaging rotation protection is at least partially provided by means of the thrust washer and is designed at a radially outer circumferential contour of the thrust washer, in particular at several circumferential positions, in particular exclusively radially outside in the radial region of the thrust washer located farthest on the outside. This also provides a good lever effect and can minimize the acting forces or the surface pressure, respectively. A wedging or canting, respectively, can also be prevented in a simple way.

According to one exemplary embodiment, the thrust washer engages in a positive and/or non-positive manner with the planetary carrier and/or with the gear housing or with a housing component (in particular the intermediate flange) of the gear housing by means of the axially-engaging rotation protection, in particular without play. This promotes the integration of the thrust washer in various gear concepts. A pure positive connection (without non-positive connection provided as intended) is thereby optionally realized. Depending on the application, this can be particularly advantageous, for example, with regard to friction-free coupling.

According to one exemplary embodiment, the axially-engaging rotation protection is provided by means of corresponding positive and/or non-positive contours or fastening means at the thrust washer as well as at least one component from the following group: planetary carrier, gear housing, housing component of the gear housing (in particular the intermediate flange). This variability also makes it possible to provide the axial rotation protection at several interfaces and/or in several gear stages without having to specifically adapt a gear concept for this purpose in a complex manner.

According to one exemplary embodiment, the axially-engaging rotation protection is at least partially provided by means of axial protrusions of the thrust washer, wherein the axial protrusions extend exclusively axially on one side on the part of the thrust washer in the direction of the planetary carrier and/or of the gear housing. This can provide advantages in particular also in the case of gear concepts comprising an intermediate flange.

According to one exemplary embodiment, the thrust washer is designed as a central thrust washer, which is assigned to a plurality of planet gears. This also makes it possible to cumulatively realize a plurality of the already described advantages in combination with one another.

In some embodiments, the thrust washer is a shaped part comprising axial protrusions created by means of shaping, such as, in particular, a bent part. This also provides for a high variability, whether with regard to the design of the thrust washer or with regard to the structural concept of the entire gear, or of at least a single gear stage.

According to one exemplary embodiment, the axially-engaging rotation protection is provided by means of a positive and/or non-positive axial coupling, which coupling ensures a material-elastic biasing in the radial direction, in particular by means of material-elastic biasing of axial protrusions of the thrust washer inward or outward in the radial direction. This can further improve the relative arrangement of the thrust washer and also the operating characteristic. Relative movements and/or acoustic emissions can further be prevented even more effectively.

A material property, which can ensure a continued force or biasing, respectively, by means of a deformation in the elastic region, such as, for example, in the case of metals or also some plastics, is to thereby be understood as being "material-elastic". Moreover, according to one exemplary embodiment, the at least one thrust washer forms a material-elastically biased coupling with the planetary carrier and/or with the gear housing (in particular the intermediate flange), in particular an axial plug-in coupling with material-elastic biasing in the radial direction. This design can also increase the variability and can provide for a simple mounting concept, thus increasing the practicability.

According to one exemplary embodiment, the thrust washer is arranged and designed in such a way that the axially-engaging rotation protection is provided relative to the planetary carrier by means of positive axial engagement with at least one axially-protruding protrusion in the axial direction. In this embodiment, the at least one axially-protruding protrusion is provided by means of the thrust washer, and the planetary carrier has at least one geometrically corresponding recess or contour for receiving the (respective) axially-protruding protrusion. A geometrically corresponding design also makes it possible to further optimize the positive and/or non-positive connection at the axially-engaging interface.

According to one exemplary embodiment, the thrust washer is arranged and designed in such a way that the axially-engaging rotation protection is provided relative to the planetary carrier by means of a positive axial engagement with at least one axially-protruding protrusion in the axial direction. In this embodiments, the at least one axially-protruding protrusion is provided by means of the thrust washer, and the planetary carrier has at least one geometrically corresponding contour, in particular a surface portion, at an outer jacket surface (thus at the outer circumference), for receiving the (respective) axially-protruding protrusion. The manner of the axial interaction can also be optimized thereby.

According to one exemplary embodiment, the thrust washer is arranged and designed in such a way that the axially-engaging rotation protection is provided relative to the gear housing, in particular relative to an intermediate flange, by means of a positive axial engagement with at least one axially-protruding protrusion in the axial direction. In this embodiment, the at least one axially-protruding protrusion is provided by means of the thrust washer, and the gear housing has at least one geometrically corresponding recess for receiving the axially-protruding protrusion. The support at the intermediate flange also provides for a rotation protection, which is particularly reliable, robust, and durable.

According to one exemplary embodiment, the axially-engaging rotation protection is provided by means of the thrust washer, in particular as an integral one-piece design at the thrust washer. This provides numerous above-mentioned advantages. Moreover, this ensures a high degree of robustness and operational safety.

The axially-engaging rotation protection can be provided at an outer contour of the thrust washer located radially on the outside, in particular at the edge of the thrust washer defining the outer circumference of the thrust washer. The axially-engaging rotation protection can be arranged at radial offset relative to the (standard) circumferential edge of the thrust washer, in particular at least 1 to 5% of the radius or diameter of the thrust washer. These designs can be particularly advantageous according to present techniques. It has generally been shown that the concept according to the present techniques can be realized particularly well with axially-engaging protrusions, which are arranged far radially on the outside.

According to one exemplary embodiment, the axially-engaging rotation protection comprises a plurality of protrusions arranged at the outer contour of the thrust washer designed as tabs, in particular as an integral one-piece design at the thrust washer (such as, for example, by means of shaping), in particular as a symmetrical-equidistantly spaced apart, fully-circumferential arrangement, such as, for example, four protrusions each offset by 90°. This also makes it possible to distribute the acting forces to more or fewer coupling points, depending on the specific application and/or the specific construction of the gear.

For example, an axially-engaging protrusion may extend in the axial direction in the range of 1 to 10 percent of the diameter of the thrust washer. As another example, an axially-engaging protrusion may extend in the circumferential direction in the range of 1 to 15° at the thrust washer.

According to one exemplary embodiment, the gear housing includes an intermediate flange (or is partially formed by an intermediate flange, particularly in sections in the axial direction). The intermediate flange includes recesses corresponding to protrusions of the axial rotation protection, in particular at an inner jacket surface, wherein the at least one thrust washer is axially rotation-protected at the intermediate flange. The coupling of the thrust washer in the intermediate flange provides a particularly advantageous integration of the thrust washer into the gear, in particular in a function as the central thrust washer with respect to a plurality of planet gears of at least one first gear stage. Moreover, in some embodiments, the intermediate flange and/or the corresponding housing component are set up to receive and arrange the planetary carrier.

According to one exemplary embodiment, the axially-engaging rotation protection is provided at the interface between several gear housing components, in particular comprising at least one intermediate flange, and/or is provided on at least one side of the planetary carrier. This relative arrangement has turned out to be particularly advantageous in connection with the axial engagement of the protrusions, in particular with regard to an integration of the thrust washer in the respective gear stage. In other words, in spite of an axial engagement, no additional axial installation space has to be provided, and all further gear components can also be arranged in the provided position largely without changes.

Advantageous types of the coupling or positive and/or non-positive pairing, respectively, between thrust washer and planetary carrier and/or gear housing (or intermediate flange, respectively), will be described in more detail below. According to one exemplary embodiment, the thrust washer is coupled to the planetary carrier and/or to the gear housing by means of a play adaptation, in particular to the gear housing (or to the intermediate flange), in particular by means of material-elastic biasing in the radial direction. This provides advantages with regard to the integration of the thrust washer, in particular in a coupling arrangement at the intermediate flange.

According to one exemplary embodiment, the thrust washer is coupled to the planetary carrier and/or to the gear housing by means of a clamping fit, in particular to the planetary carrier, such as by means of material-elastic biasing in the radial direction. This can be particularly advantageous when rotation-protecting the thrust washer in a front-side arrangement with the protrusions in axial engagement with pockets at the planetary carrier.

According to one exemplary embodiment, the thrust washer is coupled to the planetary carrier and/or to the gear housing by means of non-positive biasing, in particular to the planetary carrier by means of radially biased strutting, such as by means of material-elastic biasing in the radial direction at an outer jacket surface of the planetary carrier. This can be particularly advantageous when rotation-protecting the thrust washer in a front-side arrangement at the planetary carrier with the protrusions in axial engagement and non-positive coupling at the outer jacket surface of the planetary carrier.

These three variations can each be particularly advantageous in the individual case, and can be preferred, depending on the application or area of application of the gear. These variations can optionally also at least be partially realized in combination with one another, for example, in a gear comprising several gear stages.

According to one exemplary embodiment, the thrust washer for securing (or for establishing, respectively) the axial rotation protection is coupled/can be coupled to the planetary carrier and/or the gear housing without play (or at least essentially without play), in particular by means of the axial protrusions in a positive and/or non-positive coupling arrangement at an inner or outer jacket surface, preferably in a positive and non-positive manner. Finally, this also provides advantages with regard to the minimization of acoustic emissions (which may sound like scratching and rattling noises, for example). An additional non-positive connection can thereby in particular also be ensured via material-elastic biasing in the radial direction.

The planetary gear device described herein may include at least one axially-engaging rotation protection by means of at least one thrust washer, in particular a central thrust washer, in an axially-engaging arrangement of the thrust washer with a planetary carrier, and/or with at least one housing component, in particular an intermediate flange, of a gear housing of the planetary gear device, wherein axial protrusions are provided at the thrust washer, in particular in an integral one-piece design, and are brought into axial positive and/or non-positive engagement with the planetary carrier and/or the housing component, in particular in that the protrusions are brought into abutment without play (or at least essentially without play without perceivable relative movement at least in the circumferential direction) at an outer jacket surface of the planetary carrier and/or at an inner jacket surface of the housing component (or of the intermediate flange, respectively) at respective corresponding positive and/or non-positive contours or fastening means. This results in the above-mentioned advantages.

The planetary gear device described herein may include an intermediate flange for a gear housing for the planetary gear device, wherein the intermediate flange is set up to form an axial rotation protection in a coupling arrangement with a thrust washer, in particular a central thrust washer, wherein the intermediate flange has an inner jacket surface, which defines recesses (in particular recesses curved radially outward or concave recesses, respectively, in individual circumferential positions, each comprising a radius of curvature, which is strongly reduced with regard to the radial position thereof), which are designed so as to geometrically correspond to axial protrusions of the thrust washer, and which are arranged and set up for positive and/or non-positive coupling with the protrusions by means of axial engagement, in particular in response to material-elastic biasing in the radial direction. This results in the above-mentioned advantages. The intermediate flange is preferably set up to receive several revolving gear components, in particular planet gears.

The planetary gear device described herein may include a planetary carrier, wherein the planetary carrier is set up to form an axial rotation protection in a coupling arrangement with a thrust washer, in particular a central thrust washer, wherein the planetary carrier has an outer jacket surface, which defines surface portions (in particular at least approximately flat, planar surface portions in individual circumferential positions, each with regard to the radial direction of surfaces running at least approximately orthogonally), which are designed so as to geometrically correspond to axial protrusions of the thrust washer, and which are arranged and set up for positive and/or non-positive coupling with the protrusions by means of axial engagement, in particular in response to material-elastic biasing in the radial direction. This results in the above-mentioned advantages. The planetary carrier is preferably designed as a disk, wherein the coupling contours or surface portions, respectively, are provided at the outer jacket surface of the disk. The planar, flat surface portions can also be provided by means of recesses comprising a radial offset to the inside. Finally, this also promotes a high rotational stiffness and an exact coupling to protrusions or tabs, respectively, of the thrust washer.

The planetary gear device described herein may include a thrust washer comprising axial protrusions for the play-free non-positive and/or positive axial rotation protection of the thrust washer at a planetary carrier and/or at a gear component, in particular at an intermediate flange, of a gear housing, in relative arrangement in a planetary gear device in such a way that the axial rotation protection is provided by means of axially-engaging corresponding contours at the thrust washer as well as at the planetary carrier and/or at the gear component, in particular in an above-described planetary gear device. This results in the above-mentioned advantages.

The planetary gear device described herein may include a central thrust washer comprising axial protrusions for providing an axial rotation protection with respect to several revolving gear components (in particular planet gears) of at least a first gear stage by means of play-free non-positive and/or positive axial engagement of the thrust washer with an or at an intermediate flange or planetary carrier of a respective planetary gear device receiving the revolving gear components, in that axial protrusions of the thrust washer engage axially with corresponding contours or recesses of the intermediate flange, which extend axially, or with corresponding contours or surface portions of the planetary carrier, and cooperate in a positive and/or non-positive manner with axial contours corresponding to them, and thus form the axial rotation protection, in particular without play at several circumferential positions, in particular in an above-described planetary gear device. This results in above-mentioned advantages.

The present techniques can also be summarized as follows: axial engaging for the axial rotation protection of at least one thrust washer, in particular of a central thrust washer, can be attained in a particularly advantageous manner by means of axial protrusions at outer circumferential positions, which are provided at the interface between thrust washer and gear housing (or intermediate flange, respectively) and/or planetary carrier. The present techniques can in each case be realized by means of the individual components (e.g., the thrust washer, gear housing, intermediate flange, and/or planetary carrier), and certainly also by means of the corresponding complete planetary gear device comprising at least one two of these components (including the thrust washer).

Figure 2:
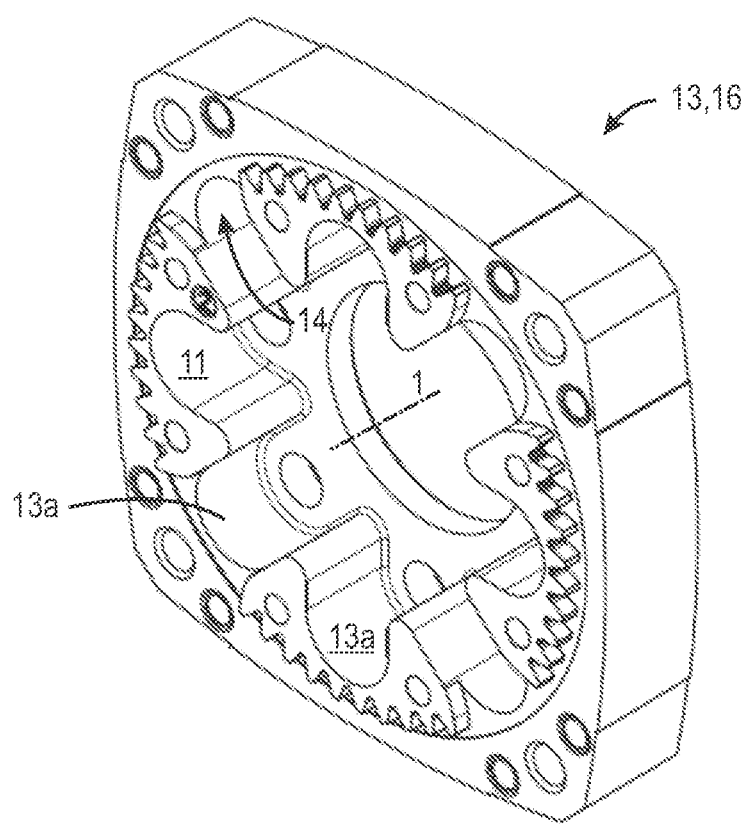
FIG. 2 is a perspective view of an exemplary embodiment of an intermediate flange or a housing component of the planetary gear device, respectively, formed for at least partially receiving the thrust washer.
Figure 3:
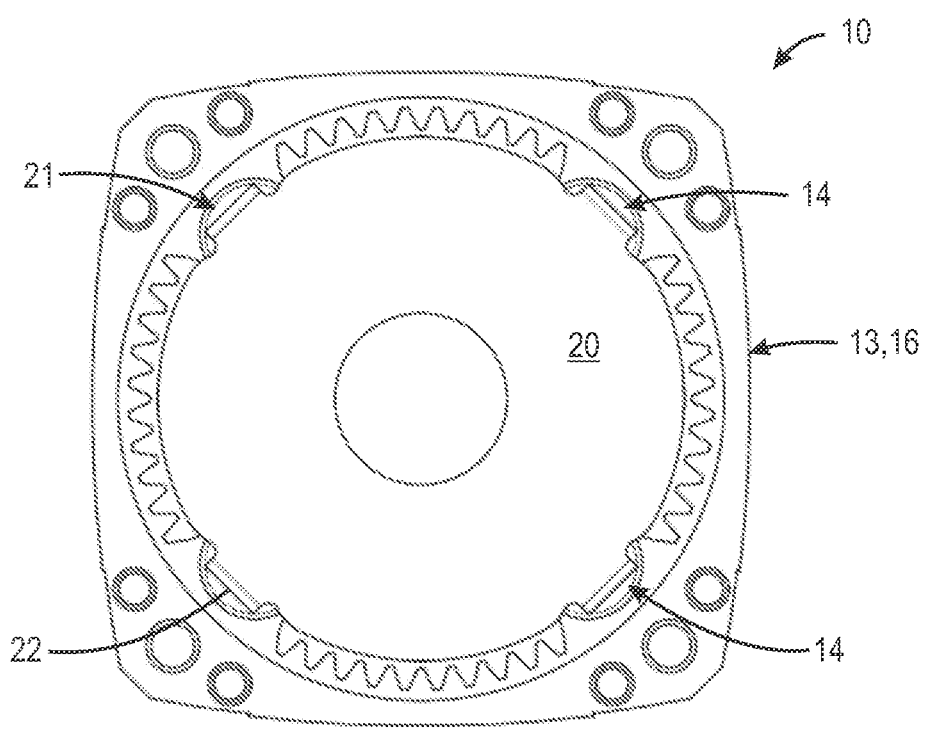
FIG. 3 is a side view of an exemplary embodiment of the intermediate flange described with respect to FIG. 2, which includes the axially-engaging thrust washer.
Figure 4:
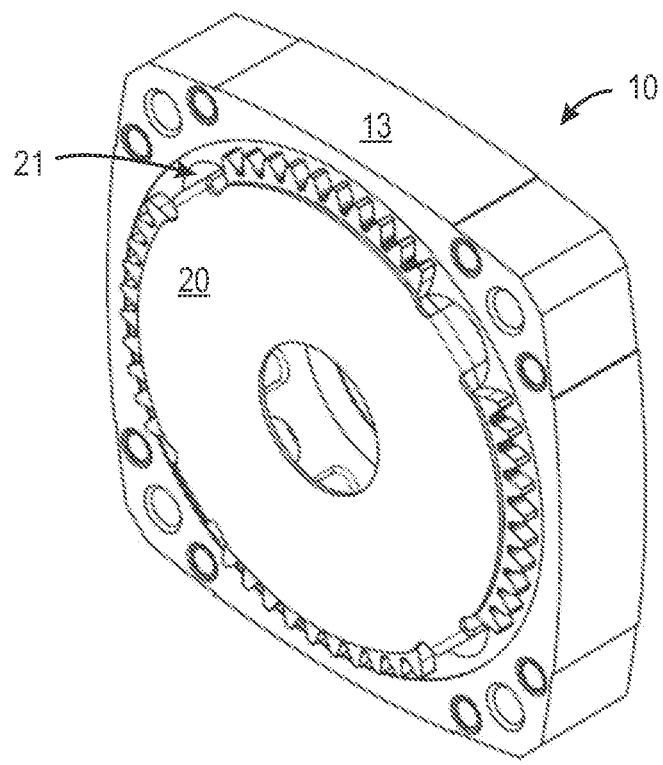
FIG. 4 is a perspective view of the exemplary embodiment of the intermediate flange described with respect to FIG. 3.
Figure 5:
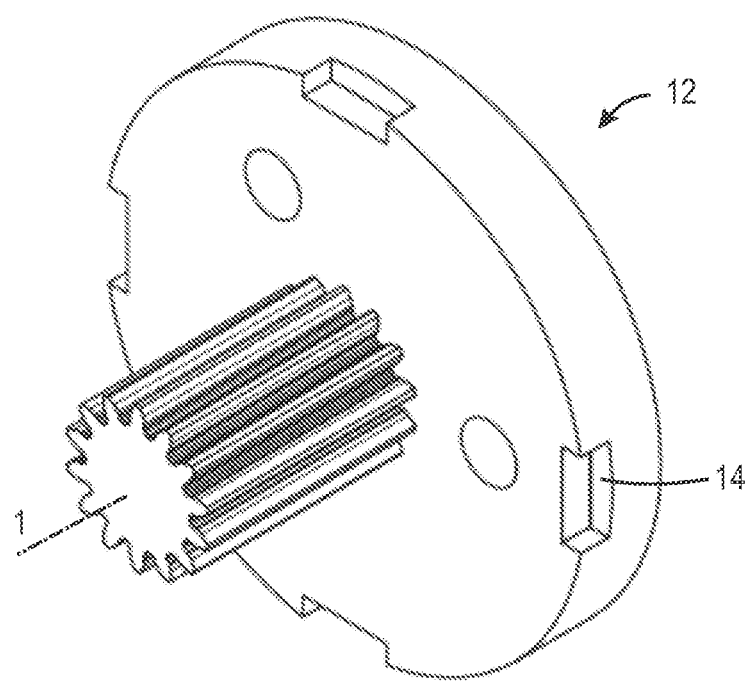
FIG. 5 is a perspective view of an exemplary embodiment of a planetary carrier, in particular a planetary carrier disk, for a planetary gear device.
Figure 6:
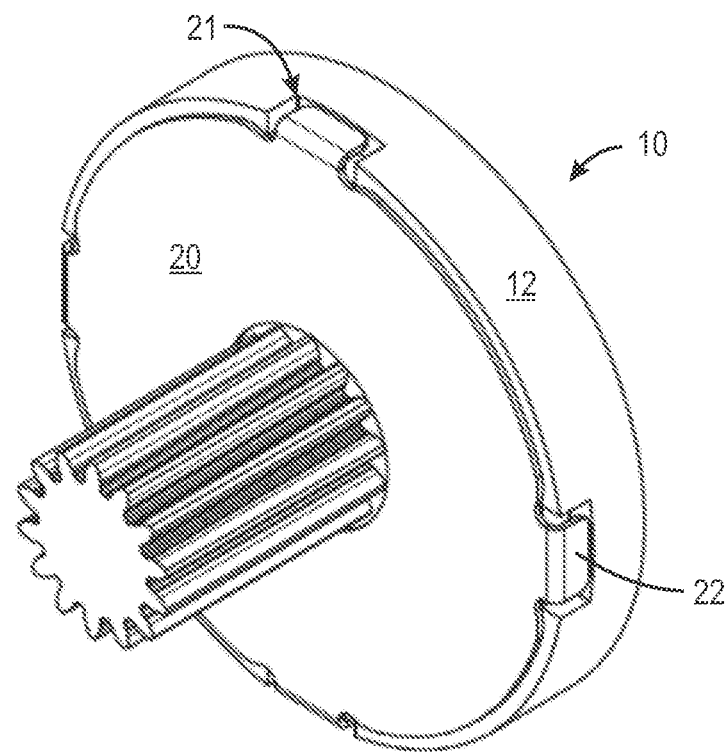
FIG. 6 is a perspective view of the exemplary embodiment of the planetary carrier described with respect to FIG. 5, which includes the axially-engaging thrust washer.
Figure 7:
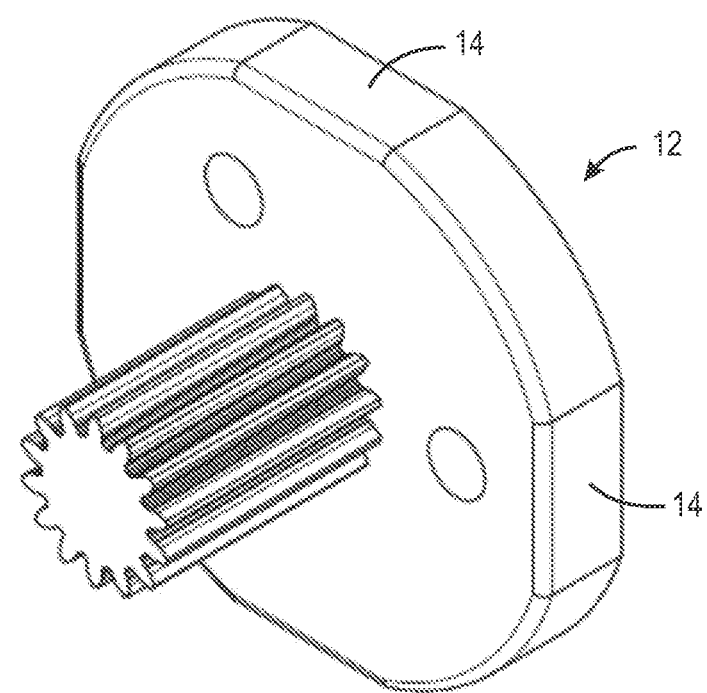
FIG. 7 is a perspective view of another exemplary embodiment of a planetary carrier, in particular a planetary carrier disk, for a planetary gear device.
Figure 8:
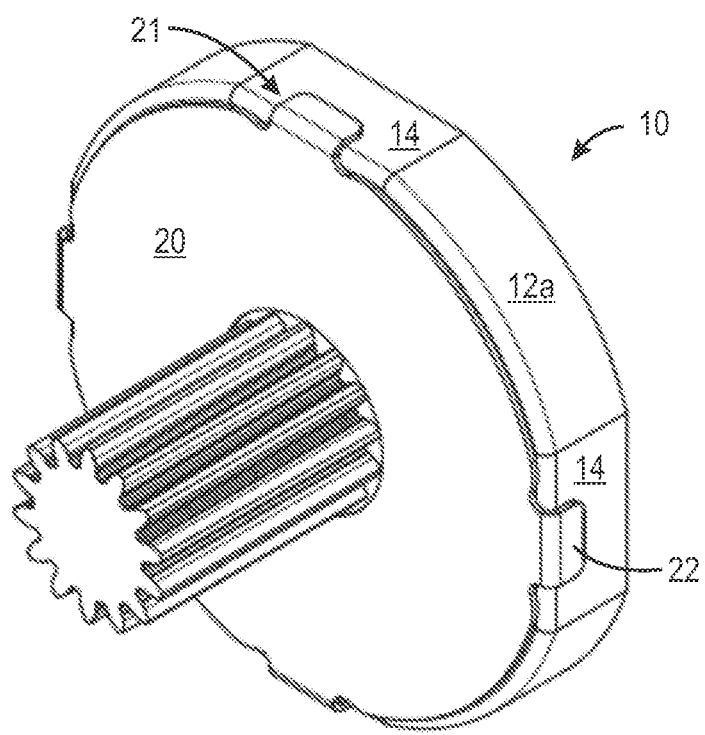
FIG. 8 is a perspective view of the exemplary embodiment of the planetary carrier described with respect to FIG. 7, which includes the axially-engaging thrust washer.

Turning now to a description of the figures, FIG. 1 is a perspective view of an exemplary embodiment of a thrust washer 20 for a planetary gear device 10. FIG. 2 is a perspective view of an exemplary embodiment of an intermediate flange 13 or a housing component 16 of the planetary gear device 10 formed for at least partially receiving the thrust washer 20. FIG. 3 is a side view of an exemplary embodiment of the intermediate flange 13 described with respect to FIG. 2, which includes the axially-engaging thrust washer 20. FIG. 4 is a perspective view of the exemplary embodiment of the intermediate flange 13 described with respect to FIG. 3. FIG. 5 is a perspective view of an exemplary embodiment of a planetary carrier 12, in particular a planetary carrier disk, for a planetary gear device 10. FIG. 6 is a perspective view of the exemplary embodiment of the planetary carrier 12 described with respect to FIG. 5, which includes the axially-engaging thrust washer 20. FIG. 7 is a perspective view of another exemplary embodiment of a planetary carrier 12, in particular a planetary carrier disk, for a planetary gear device 10. FIG. 8 is a perspective view of the exemplary embodiment of the planetary carrier 12 described with respect to FIG. 7, which includes the axially-engaging thrust washer 20. Moreover, in the figures, like numbered items indicate the same (or similar) features or components.

A planetary gear device 10 comprises several revolving gear components 11, in particular so-called planet gears, as well as a planetary carrier 12, in particular designed as a disk (carrier disk) comprising an outer jacket surface 12a, and a gear housing 16, which can at least be partially provided by means of an intermediate flange 13 (or gear housing component). The intermediate flange 13 has an inner jacket surface 13a. Recesses or cavities, respectively, or geometrically corresponding axial contours 14, respectively, are provided at the intermediate flange 13 and/or at the planetary carrier 12. A thrust washer 20 provides an axially-engaging rotation protection 21, in that axial protrusions 22, in particular tabs or lugs or axial elevations, are designed so as to geometrically correspond to the axial contours 14 and thus interact in the axial direction. The protrusions 22 are designed at an outer edge 23 or a circumferential contour (boundary), respectively. The rotating components rotate around an axis of rotation 1, which extends at least approximately in the axial direction x.

A thrust washer 20, which has four axial protrusions 22, each designed as tabs, which are arranged in circumferential positions, each offset by approx. 90°, is shown in an exemplary manner in FIG. 1. Aside from the tabs, the thrust washer 20 also has a central bore, in particular for receiving a central gear component, such as a gearwheel of a planetary carrier. In the case of the present exemplary embodiment, this central bore does not fulfill any function for the rotation protection. On the contrary, the bore has a circular inner edge without radial protrusions. Aside from the central bore, the thrust washer 20 also does not have any further openings or recesses in the disk, but is designed as holohedral circular ring disk.

An intermediate flange 13, which can be mounted between at least two further housing components (not illustrated), is shown in an exemplary manner in FIG. 2. The intermediate flange 13 can holohedrally form the housing at least in a narrow axial portion. The intermediate flange 13 in particular has several axial fastening means for the axial frontal clamping of the intermediate flange 13 with at least one further housing component, in particular in both sides (intermediate flange in the narrower sense). For the intermediate flange 13 shown in FIG. 2, the thrust washer 20 shown in FIG. 1 can be used as a central thrust washer. For the sake of completeness, one of several planet gears 11 (revolving gear component) is also suggested purely schematically in FIG. 2.

FIG. 3 illustrates the use of the thrust washer 20 as the central thrust washer in the intermediate flange 13 in FIG. 3, wherein the axial rotation protection is ensured by means of a quadruple redundant axial engagement of the four protrusions 22 with the respective cavity 14, which is provided by means of the inner jacket surface 13a, which is curved inward. In other words, in the mounted state, the lugs 22 contact with the inner boundary of the intermediate flange.

Positive and/or non-positive connection can thereby also be optimized in particular by means of at least slight biasing in the radial direction. The intermediate flange can in particular exert a compressive force radially inward, in reaction to an elastic biasing force of the protrusions radially outward. The protrusions or tabs 22, respectively, can in particular be biased slightly radially outward, so that they are bent slightly radially inward in response to the coupling to the intermediate flange. In particular, in combination with the portions of the inner jacket surface 13a, which are curved concavely inward (outward in the radial direction), a linear contact for each protrusion can be ensured at two or more points for each protrusion, in particular at opposite circumferential flanks of the respective protrusion, thus in the axial direction along the respective recess 14. An effective, play-free axial rotation protection can thereby be provided in a simple manner by means of fastening means, which are designed in a comparatively simple manner. In general, the exemplary embodiment of FIG. 3 can be understood as an example of a play adaptation, whereby a radial biasing can optionally be realized.

FIG. 4 shows the axial rotation protection 21 in a perspective view. Due to the circumferential contour of the tabs 22, the tabs 22 in each case abut linearly against the inner jacket surface 13a in the corresponding cavity 14. The curvature of the inner jacket surface 13a and a slight radial biasing of the tabs 22 promote a play-free coupling or fit, respectively, in particular in combination with material-elastic radial biasing. The edges or surface portions of the tabs 22, respectively, which point outward, can be designed so as to geometrically correspond to the corresponding portion of the inner jacket surface 13a, in particular linearly or in a flat manner (optionally also with a profile or similar surface structure for optimized positive/non-positive connection).

FIG. 5 describes a use of the thrust washer 20 for a planetary carrier, here designed as the carrier disk 12. The geometrically corresponding axial contours 14 are provided here by means of pockets or recesses, which can be integrated, for example, into the outer jacket surface 12a. The pockets have a bottom, which is designed so as to geometrically correspond to the inner sides of the tabs 22, in particular in a flat manner, optionally also with a profile or similar surface structure for optimized positive/non-positive connection.

FIG. 6 illustrates the engaging around the contours 14 by means of the tabs 22, which can thereby exert a radial biasing to the inside. The tabs 22 can thereby advantageously be integrated into the pockets 14 in a sunk arrangement. The circumferential extension of the pockets can thereby be at least approximately as large as that of the tabs. Depending on the direction of rotation, the lateral flanks or surfaces, respectively, thereby form rotation stops. The size of a play can be set via the dimension and position tolerances, and an at least approximately play-free coupling can also be provided in the case of a fit. The thrust washer 20 can thereby abut against the front side of the planetary carrier 12 in a largely flat and planar manner. In general, the exemplary embodiment of FIG. 6 can be understood as an example of a clamping fit, wherein a radial biasing can optionally be realized.

FIG. 7 describes an alternative design of the planetary carrier 12. Instead of pockets, which can be lowered, planar, flat surface portions 14 are provided, which are designed so as to geometrically correspond to the inner sides of the tabs 22. Depending on the design of the planetary carrier and depending on the material combination of the disk of the planetary carrier and of the thrust washer, one of these variations (lowered pockets or only planar surface portions at the outer circumferential contour) can be particularly advantageous, in particular also as a function of whether a play-free coupling is desired, or as a function of whether or to what extent a non-positive connection is to also be provided in addition to a positive connection.

FIG. 8 shows the engaging around the contours 14 by means of the tabs 22, to form the axial rotation protection 21, according to the exemplary embodiment of FIG. 7. In general, the exemplary embodiment of FIG. 8 can be understood as an example of a combined positive and non-positive connection, wherein the amount of radial biasing that the tabs 22 exert on the pockets 14 can also be set or predefined by means of the material properties of the tabs and/or the size of the tabs. A mounting can take place, such as, for example, in that the tabs are strutted radially to the outside in response to the mounting.

While the embodiments described herein are well-calculated to achieve the advantages set forth, it will be appreciated that the embodiments described herein are susceptible to modification, variation, and change without departing from the spirit thereof. Indeed, the present techniques include all alternatives, modifications, and equivalents falling within the true spirit and scope of the appended claims.

What is claimed is:

1. A planetary gear device, comprising:
gear components revolving around an axis of rotation, wherein the gear components comprise a planet gear;
a planetary carrier for the planet gear;
a gear housing encasing the revolving gear components;
a thrust washer supported around or at the axis of rotation; and
a rotation protection, by means of which the thrust washer can be positioned so as to be rotation-protected;
wherein the rotation protection is an axially-engaging rotation protection, and wherein the thrust washer is arranged such that the axially-engaging rotation protection is provided relative to the planetary carrier and/or relative to the gear housing by means of an axially-protruding protrusion at an interface between the thrust washer, the planetary carrier, and/or the gear housing; and
wherein the gear housing comprises an intermediate flange or is at least partially formed by the intermediate flange, at which intermediate flange recesses corresponding to protrusions of the axial rotation protection are formed, in particular at an inner jacket surface, wherein the thrust washer is axially rotation-protected at the intermediate flange.

2. The planetary gear device of claim 1, wherein the planetary carrier is designed as a disk.

3. The planetary gear device of claim 1, wherein the axially-engaging rotation protection is at least partially provided by means of the thrust washer and is designed at a radially outer circumferential contour of the thrust washer, in particular at several circumferential positions, in particular exclusively radially outside in a radial region of the thrust washer located farthest on an outside.

4. The planetary gear device of claim 1, wherein the thrust washer engages in a positive and/or non-positive manner with the planetary carrier and/or with the gear housing or with a housing component of the gear housing by means of the axially-engaging rotation protection, in particular without play.

5. The planetary gear device of claim 1, wherein the thrust washer is designed as a central thrust washer, which is assigned to a plurality of planet gears; and/or wherein the thrust washer is a shaped part comprising axial protrusions created by means of shaping.

6. The planetary gear device of claim 1, wherein the axially-engaging rotation protection is provided by means of a positive and/or non-positive axial coupling, which coupling ensures a material-elastic biasing in the radial direction, in particular by means of material-elastic biasing of axial protrusions of the thrust washer inward or outward in the radial direction; and/or wherein the thrust washer forms a material-elastically biased coupling with the planetary carrier and/or with the gear housing, in particular the intermediate flange, in particular an axial plug-in coupling with material-elastic biasing in the radial direction.

7. The planetary gear device of claim 1, wherein the thrust washer is arranged such that the axially-engaging rotation protection is provided relative to the planetary carrier by means of positive axial engagement with an axially-protruding protrusion in the axial direction, wherein the axially-protruding protrusion is provided by means of the thrust washer, and wherein the planetary carrier has a geometrically corresponding contour at an outer jacket surface, in particular a surface portion, for receiving the axially-protruding protrusion.

8. The planetary gear device of claim 1, wherein the axially-engaging rotation protection is provided by means of the thrust washer, in particular as an integral one-piece design of the thrust washer; and/or wherein the axially-engaging rotation protection is provided at an outer contour of the thrust washer located radially on the outside, in particular at the edge of the thrust washer defining the outer circumference of the thrust washer; and/or wherein the axially-engaging rotation protection is arranged at a radial offset relative to the circumferential edge of the thrust washer, in particular at least 1 to 5% of a radius or a diameter of the thrust washer.

9. The planetary gear device of claim 1, wherein the axially-engaging rotation protection comprises a plurality of protrusions arranged at the outer contour of the thrust washer designed as tabs, in particular in symmetrical equidistantly spaced apart, fully-circumferential arrangement of four protrusions each offset by 90°; and wherein the plurality of protrusions extend in an axial direction in a range of 1 to 10 percent of a diameter of the thrust washer; and wherein the plurality of protrusions extend in a circumferential direction in a range of 1 to 15° at the thrust washer.

10. The planetary gear device of claim 1, wherein the thrust washer is coupled to the gear housing by means of a play adaptation to the gear housing, in particular by means of material-elastic biasing in the radial direction; or wherein the thrust washer is coupled to the planetary carrier by means of a clamping fit to the planetary carrier, in particular by means of material-elastic biasing in the radial direction; or wherein the thrust washer is coupled to the planetary carrier by means of non-positive biasing to the planetary carrier by means of radially strutted tabs, in particular by means of material-elastic biasing in a radial direction at an outer jacket surface of the planetary carrier.

11. The planetary gear device of claim 1, wherein the thrust washer for securing the axial rotation protection is coupled to the planetary carrier and/or the gear housing without play or at least essentially without play, in particular by means of the axial protrusions in a positive and/or non-positive coupling arrangement at an inner or outer jacket surface.

12. The planetary gear device of claim 1, wherein the axially-engaging rotation protection is provided by the thrust washer in an axially-engaging arrangement of the thrust washer with the planetary carrier or with the intermediate flange of the planetary gear device, wherein axial protrusions are provided at the thrust washer, in particular as an integral one-piece design, and are brought into axial positive or non-positive engagement with the planetary carrier or the intermediate flange, in particular in that the axial protrusions are brought into abutment without play at an outer jacket surface of the planetary carrier or at an inner jacket surface of the intermediate flange at respective corresponding positive or non-positive contours.

13. The planetary gear device of claim 1, wherein the intermediate flange is set up to form axial rotation protection in a coupling arrangement with the thrust washer; and wherein the intermediate flange has an inner jacket surface that defines recesses; and wherein the recesses are designed so as to geometrically correspond to axial protrusions of the thrust washer, and which are arranged and set up for a positive or non-positive coupling with the axial protrusions by means of axial engagement, in particular in response to material-elastic biasing in a radial direction.

14. The planetary gear device of claim 1, wherein the planetary carrier is set up to form an axial rotation protection in a coupling arrangement with the thrust washer; and wherein the planetary carrier has an outer jacket surface that defines surface portions; and wherein the surface portions are designed so as to geometrically correspond to axial protrusions of the thrust washer, and which are arranged and set up for a positive and/or non-positive coupling with the axial protrusions by means of axial engagement, in particular in response to material-elastic biasing in a radial direction.

15. A thrust washer for a planetary gear device, comprising axial protrusions for a play-free non-positive and/or positive axial rotation protection of the thrust washer at a planetary carrier and/or at a gear housing component, in relative arrangement in the planetary gear device such that the axial rotation protection is provided by means of axially-engaging corresponding contours at the thrust washer as well as at the planetary carrier and/or at the gear housing component;

wherein the gear housing comprises an intermediate flange or is at least partially formed by the intermediate flange, at which intermediate flange recesses corresponding to contours of the thrust washer are formed, in particular at an inner jacket surface, wherein the thrust washer is axially rotation-protected at the intermediate flange.

16. A planetary gear device, comprising:
an intermediate flange comprising an inner jacket surface that defines recesses that extend axially;
a central thrust washer comprising axial protrusions for providing an axial rotation protection with respect to revolving gear components of a gear stage by means of play-free non-positive and/or positive axial engagement of the central thrust washer with the intermediate flange or a planetary carrier of the planetary gear device, in that axial protrusions of the thrust washer engage axially with corresponding recesses of the inner jacket surface of the intermediate flange in response to material-elastic biasing in a radial direction, or with corresponding contours or surface portions of the planetary carrier, and cooperate in a positive and/or non-positive manner with axial contours corresponding to the planetary carrier, and thus form the axial rotation protection.

17. The central thrust washer of claim 16, wherein the revolving gear components comprise at least one planet gear.

18. The central thrust washer of claim 16, wherein the axial rotation protection is provided without play at several circumferential positions.

* * * * *